United States Patent [19]
Hardtmann

[11] 3,875,161

[45] Apr. 1, 1975

[54] IMIDAZO(2,1-B)QUINAZOLIN-5(1OH)-ONES

[75] Inventor: Goetz E. Hardtmann, 208 Brooklake Rd., Florham Park, N.J. 07932

[73] Assignee: Sandoz-Wander, Inc., Hanover, N.J.

[22] Filed: Feb. 12, 1973

[21] Appl. No.: 331,561

Related U.S. Application Data

[63] Continuation-in-part of Ser. No. 163,106, July 15, 1971, abandoned.

[52] U.S. Cl............................ 260/256.4 F, 424/251
[51] Int. Cl.............................................. C07d 51/42
[58] Field of Search.............................. 260/256.4 F

[56] References Cited
UNITED STATES PATENTS

| | | | |
|---|---|---|---|
| 3,257,401 | 6/1966 | Wagner........................ | 260/256.4 F |
| 3,598,823 | 8/1971 | Hardtmann.................... | 260/256.4 F |
| 3,621,025 | 11/1971 | Jen................. | 260/256.4 F |
| 3,790,573 | 2/1974 | Blackburn et al............ | 260/256.4 F |

Primary Examiner—Donald G. Daus
Assistant Examiner—James H. Turnipseed
Attorney, Agent, or Firm—Gerald D. Sharkin; Richard E. Vila

[57] ABSTRACT

The compounds are of the class of imidazo[2,1-b]quinazolin-5(1OH)-ones, useful, for example, as bronchodilator agents. The compounds are prepared by dehydrogenation of the corresponding 2,3-dihydro-imidazo[2,1-b]quinazolin-5(1OH)-ones.

12 Claims, No Drawings

IMIDAZO(2,1-B)QUINAZOLIN-5(1OH)-ONES

This application is a continuation-in-part of application Ser. No. 163,106, filed July 15, 1971, now abandoned.

The present invention relates to tricyclic compounds which are quinazolinones, and to their preparation. The invention also relates to pharmaceutical methods and compositions for utilization of the compounds based on their biological activity.

The compounds of the present invention may be represented structurally by the following formula I:

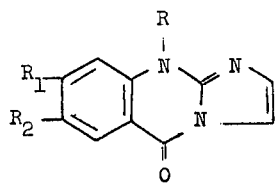

wherein
  each of $R_1$ and $R_2$ is, independently, hydrogen, halo of atomic weight not greater than 36 or lower alkyl of 1 to 3 carbon atoms, or both are lower alkoxy of 1 or 2 carbon atoms, or one is hydrogen and the other bromo or lower alkoxy of 1 or 2 carbon atoms,
  R is lower alkyl of 1 to 5 carbon atoms, alkenyl of 3 to 10 carbon atoms, e.g. allyl, methallyl, butene-2, hexene-5 and octene-7,

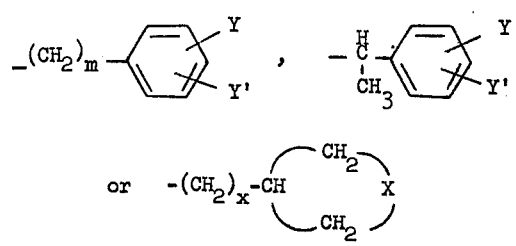

$m$ is 1 or 2,
  X is a direct bond or $-(CH_2)_n-$;
  $n$ is 1 to 3, inclusive,
  $x$ is 0 to 2, inclusive,
  each of Y and Y' is, independently, hydrogen, halo of atomic weight of from 18 to 36, i.e. fluoro or chloro, lower alkyl of 1 to 3 carbon atoms or both are lower alkoxy of 1 or 2 carbon atoms, or one is hydrogen and the other bromo or lower alkoxy of 1 or 2 carbon atoms, or a pharmaceutically acceptable acid addition salt thereof.

The preferred method for preparation of the compounds of the formula I involves dehydrogenation in a Step A reaction of a corresponding compound of the formula II:

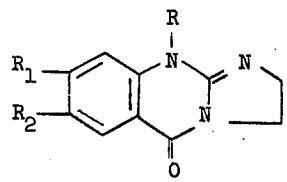

wherein R, $R_1$ and $R_2$ are as defined.

The preparation of a compound I from the corresponding compound II by Step A reaction involves a dehydrogenation which may be carried out in a conventional manner for effecting the introduction of a double bond into a cyclic system containing an ethylene linkage. The dehydrogenation is conveniently effected with a dehydrogenation catalyst or other suitable dehydrogenation reagents at temperatures in the range of from 50° to 180°C., more usually 70° to 150°C., and in an inert organic solvent. Examples of the more suitable conventional dehydrogenation reagents and catalysts which may be employed include palladium on carbon, manganese dioxide and dichlorodicyanoquinone. Any of the several conventional inert organic solvents may be employed, preferably the aromatic solvents such as benzene, toluene, and xylene. The reaction product of the formula I may be recovered from the reaction mixture of Step A by working up by conventional procedures.

The compounds of the formula II are preferably prepared by reacting in a Step B a compound of the formula III:

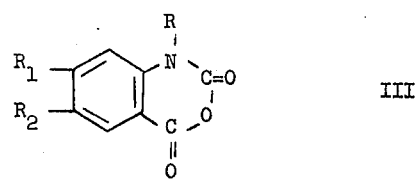

wherein $R_1$, $R_2$ and R are as defined, with a compound of formula IV:

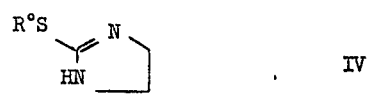

wherein R° is lower alkyl or benzyl.

The preparation of compounds II by the reaction of Step B can be carried out at temperatures in the range of 20° to 160°C., more usually 20° to 140°C., preferably 80° to 120°C. The reaction is conveniently carried out in an organic solvent of conventional type providing an inert reaction medium. Cyclic ethers suitable for use at reflux temperatures represent the preferred solvent, particularly dioxane. In general, the reaction product of formula II may be recovered from the reaction of Step B by working up by conventional procedures.

The compounds of the formulae III and IV employed as starting materials in the reaction of Step B are either known or may be prepared from known materials by established procedures.

Also within the scope of the novel compounds of the formula I provided by the invention are pharmaceutically acceptable salts not materially depreciating the pharmacological effect of the compounds. Such salts include the acid addition salts of known type, e.g., the hydrochloride. The acid addition salts may be produced from the corresponding free bases by conventional procedures. Conversely, the free bases may be obtained from the salts by procedures known in the art.

The compounds of formula I of the invention are useful because they possess biological activity. In particular, the compounds of the formula I in which R is alkyl, alkenyl or unsubstituted and substituted benzyl, phenethyl and α-methyl-benzyl are useful as broncho-dilator agents as indicated by measuring bronchial resistance on intravenous administration in the anesthetized guinea pig according to the test of Konzett and Rossler, Arch. Exp. Pat. und Paharmak. 195: 71 (1940); and by observing the respiratory status on oral administration to the unanesthetized guinea pig exposed to aerosolized histamine dihydrochloride according to a modification of the method of Van Arman et al., J. Pharmacol. Exptl. Therap. 133: 90–97, 1961; and in vitro by observing the effect on strips of guinea pig trachea according to the method of Constantine, J. Pharm. Pharmacol. 17: 384–385, 1960. For such use and depending upon known variables satisfactory results are obtained in general on the daily administration of from 1 to 200 milligrams per kilogram of body weight, preferably given in divided doses two to four times a day, or in sustained release form. For most mammals the administration of from 80 to 2000 milligrams per day provides satisfactory results and dosage forms suitable for internal administration comprise 20 to 1000 milligrams of the compound in admixture with a solid or liquid pharmaceutical carrier or diluent.

The compounds of formula I in which R is cycloalkyl or cycloalkylalkyl are useful as hypotensive agents as indicated by a lowering of blood pressure on intravenous administration to the anesthetized dog. For such use and depending upon known variables satisfactory results are obtained in general on daily administration of from 5 to 100 milligrams per kilogram of body weight. For most mammals the administration of from 40 to 1000 milligrams per day provides satisfactory results and dosage forms for internal administration comprise from 10 to 500 milligrams in combination with a suitable carrier.

For the above uses, the compounds may be combined with a pharmaceutically acceptable carrier, and such other conventional adjuvants as may be necessary, and administered orally or parenterally. For most uses oral administration with carriers is preferred and may take place in such conventional forms as tablets, dispersible powders, granules, capsules, suspensions, syrups and elixirs. Such compositions may be prepared according to any method known in the art for the manufacture of pharmaceutical compositions, and such compositions may contain one or more conventional adjuvants, such a sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxy-benzoate). Capsules may contain the active ingredient alone or admixed with an inert solid diluent, e.g., calcium carbonate, calcium phosphate and kaolin. The preferred pharmaceutical compositions from the standpoint of preparation and ease of oral administration are solid compositions, particularly hard-filled capsules and tablets.

A representative formulation is a tablet for oral administration two to four times a day for prophylactic treatment of bronchial asthma and prepared by conventional tabletting techniques to contain the following ingredients:

| Ingredients | Weight (mg.) |
|---|---|
| 10-benzyl-imidazo[2,1-b]quinazolin-5(10H)-one | 100 |
| Tragacanth | 10 |
| Lactose | 147.5 |
| Corn Starch | 25 |
| Talcum | 15 |
| Magnesium Stearate | 2.5 |

In addition, the compounds of the formula I may be administered as bronchodilators by inhalation therapy in a conventional manner, e.g. by the use of nebulizers, vaporizers, aerosols and the like. Compositions for use in administration by inhalation therapy may be prepared accordingly to conventional procedures and contain the usual conventional ingredients employed in such compositions. A representative formulation prepared by conventional techniques for use with a metered value system contains the following ingredients:

| | |
|---|---|
| 10-benzyl-imidazo[2,1-b]quinazolin-5(10H)-one | 0.4 – 20% |
| Ethyl alcohol | 10 – 40% |
| Ascorbic acid | 1 – 10% |
| Freon 11 | 10 – 30% |
| Freon 114 | 10 – 30% |
| Freon 12 | 30 – 60% |
| Buffer System — pH control | q.s. |
| Flavor | q.s. |

The following examples are for purposes of illustration only.

EXAMPLE 1

10-Benzyl-imidazo[2,1-b]quinazolin-5(10H)-one

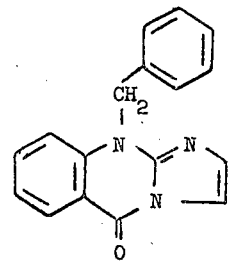

STEP A: Preparation of 2,3-Dihydro-10-benzyl-imidazo[2,1-b]quinazolin-5(10H)-one A mixture of 12.7 g. of N-benzylisatoic anhydride, 5.8 g. of 2-methylmercapto-imidazoline and 2 pellets of sodium hydroxide in 200 ml. of dioxane was refluxed for 2 hours. While still hot, the mixture was then filtered through Celite and the filtrate concentrated to about 50 ml. volume. 50 ml. of diethyl ether was added and the crystalline precipitate removed by filtration. The residue was dissolved in methylene chloride, treated with charcoal, filtered through alumina, and the filtrate evaporated. The residue was crystallized from methylene chloride/diethyl ether to obtain the heading compound, m.p. 203°–205°C.

STEP B: Preparation of 10-Benzyl-imidazo[2,1-b]quinazolin-5(10H)-one

A solution of 1.4 g. of 2,3-dihydro-10-benzyl-imidazo[2,1-b]quinazolin-5(10H)-one in 100 ml. of benzene is concentrated on a steam bath to about three-quarters of its volume and there is added thereto a solution of 1.4 g. of dichlorodicyanoquinone in 30 ml. of benzene. The resulting solution is heated for 30 minutes on the steam bath, an additional 300 mg. of dichlorodicyanoquinone added followed by heating on the steam bath for 30 more minutes and the addition of 500 mg. of additional dichlorodicyanoquinone followed by heating on the steam bath for an additional 30 minutes. The resulting precipitated material is separated by decantation and the organic solution washed twice with 1N. sodium hydroxide and then twice with water and then once with sodium chloride solution, followed by drying and evaporation in vacuo. The resulting solid residue is dissolved in methylene chloride, treated with charcoal and aluminum oxide, filtered and diethyl ether added to crystallize a material which is removed by filtration after which the filtrate and crystalline material are recombined in methylene chloride followed by evaporation in vacuo to obtain a residue which is sublimed to obtain 10-benzyl-imidazo[2,1-b]quinazolin-5(10H)-one, m.p. 170°–172°C.

EXAMPLE 2

A mixture of 1.4 g. of 2,3-dihydro-10-benzyl-imidazo[2,1-b]quinazolin-5(10H)-one, 3.0 g. of manganese dioxide and 30 ml. of xylene is refluxed with stirring for 4 hours. The resulting mixture while hot is filtered through Celite to remove manganese dioxide, the manganese dioxide washed with benzene and the filtrate washed first with dilute (0.5N) hydrochloric acid, then with water and then with saturated sodium hydroxide solution followed by drying and concentration in vacuo until a precipitate starts to form. An equal volume of diethyl ether is added and the resulting crystalline material filtered off and washed with diethyl ether to obtain 10-benzyl-imidazo[2,1-b]quinazolin-5(10H)-one, m.p. 171°–172°C.

EXAMPLE 3

Following the procedure of Example 2 the following compounds of the invention are prepared:

A. 10-(4'-fluorobenzyl)-imidazo[2,1-b]quinazolin-5(10H)- one, m.p. 157°–159°C.
B. 10-(4'-bromobenzyl)-imidazo[2,1-b]quinazolin-5(10H)- one, m.p. 211°–213°C.
C. 10-(2', 6'-dichlorobenzyl)-imidazo[2,1-b]quinazolin-5(10H)-one, 173°–**°C.
D. 10-allyl-imidazo[2,1-b]quinazolin-5(10H)-one, m.p. 125°–127°C.
E. 7-chloro-10-cyclopropylmethyl-imidazo[2,1-b]quinazolin-5(10H)-one, m.p. 115°–118°C.
F. 7,8-dimethoxy-10-cyclopropylmethyl-imidazo[2,1-b]quinazoline-5(10H)-one.
G. 10-(5-hexenyl)-imidazo[2,1-b]quinazolin-5(10H)-one.
H. 10-cyclohexyl-imidazo[2,1-b]quinazolin-5(10H)-one.
I. 10-(3',4'-dimethoxybenzyl)-imidazo[2,1-b]quinazolin-5(10H)-one.
J. 10-phenethyl-imidazo[2,1-b]quinazolin-5(10H)-one.
K. 10-(2'-methylbenzyl)-imidazo[2,1-b]quinazolin-5(10H)-one.
L. 10-($\alpha$-methyl-benzyl)-imidazo[2,1-b]quinazolin-5(10H)-one.
M. 10-(4'-fluorobenzyl)-8-methyl-imidazo[2,1-b]quinazolin-5(10H)-one.

What is claimed is:

1. A compound of the formula:

wherein
each of $R_1$ and $R_2$ is, independently, hydrogen, halo of atomic weight not greater than 36 or lower alkyl of 1 to 3 carbon atoms, or both are alkoxy of 1 to 2 carbon atoms, or one is hydrogen and the other bromo or lower alkoxy of 1 or 2 carbon atoms,
R is alkyl of 1 to 5 carbon atoms, alkenyl of 3 to 10 carbon atoms, $-(CH_2)_m$—⟨phenyl⟩$_{Y,Y'}$,  $-\underset{CH_3}{\overset{H}{C}}$—⟨phenyl⟩$_{Y,Y'}$ or $-(CH_2)_x-CH\underset{CH_2}{\overset{CH_2}{\diagup}}X\diagdown$ $m$ is 1 or 2,
X is a direct bond or $-(CH_2)_n-$,
$n$ is 1 to 3,
$x$ is 0 to 2,
each of Y and Y' is, independently, hydrogen, halo of atomic weight not greater than 36, alkyl of 1 to 3 carbon atoms, or both are alkoxy of 1 to 2 carbon atoms, or one is hydrogen and the other bromo or lower alkoxy of 1 or 2 carbon atoms, or a pharmaceutically acceptable acid addition salt thereof.

2. A compound of claim 1 in which R is alkyl.
3. A compound of claim 1 in which R is $-(CH_2)_m$—⟨phenyl⟩$_{Y,Y'}$ 4. A compound of claim 3 in which $m$ is 1.
5. The compound of claim 4 in which each of $R_1$ and $R_2$ is hydrogen.
6. A compound of claim 1 in which R is alkenyl.
7. A compound of claim 1 in which R is other than alkenyl.
8. A compound of claim 1 in which R is alkyl, alkenyl, $-(CH_2)_m$—⟨phenyl⟩$_{Y,Y'}$  or  $-\underset{CH_3}{\overset{H}{C}}$—⟨phenyl⟩$_{Y,Y'}$ 9. The compound of claim 5 in which R is benzyl.
10. The compound of claim 5 in which R is 4'-fluorobenzyl.
11. A compound of claim 5 in which Y and Y' are selected from the group consisting of hydrogen and halo.
12. A compound of claim 11 in which in which halo is fluoro.

* * * * *